(12) United States Patent
Baita et al.

(10) Patent No.: US 10,308,731 B2
(45) Date of Patent: *Jun. 4, 2019

(54) METHOD FOR FEEDING AN ANTISTATIC COMPOUND TO A POLYMERIZATION REACTOR

(75) Inventors: Pietro Baita, Santa Maria Maddalena (IT); Paolo Ferrari, Ferrara (IT); Ines Mingozzi, Ferrara (IT); Lorella Pedriali, Ferrara (IT); Maria Di Diego, Bologna (IT); Roberta Pica, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 317 days.

This patent is subject to a terminal disclaimer.

(21) Appl. No.: 13/876,719

(22) PCT Filed: Sep. 26, 2011

(86) PCT No.: PCT/EP2011/066680
§ 371 (c)(1),
(2), (4) Date: Mar. 28, 2013

(87) PCT Pub. No.: WO2012/041811
PCT Pub. Date: Apr. 5, 2012

(65) Prior Publication Data
US 2013/0197171 A1    Aug. 1, 2013

Related U.S. Application Data

(60) Provisional application No. 61/404,679, filed on Oct. 7, 2010.

(30) Foreign Application Priority Data

Sep. 28, 2010 (EP) .................................. 10181234

(51) Int. Cl.
*C08F 4/16* (2006.01)
*C08F 2/44* (2006.01)
(Continued)

(52) U.S. Cl.
CPC ................ *C08F 4/16* (2013.01); *C08F 10/00* (2013.01); *C08F 110/02* (2013.01); *C08F 210/16* (2013.01); *C08F 2410/02* (2013.01)

(58) Field of Classification Search
USPC .......................................................... 526/74
See application file for complete search history.

(56) References Cited

U.S. PATENT DOCUMENTS 5,034,481 A * 7/1991 Funk et al. ..................... 526/74
5,756,606 A    5/1998 Wong
(Continued)

FOREIGN PATENT DOCUMENTS

EP        2192133         6/2010
WO    WO2008022900        2/2008
(Continued)

OTHER PUBLICATIONS

Alfa Aesar, glycerol monostearate, retrieved Apr. 2015.*
(Continued)

*Primary Examiner* — Fred M Teskin (57) ABSTRACT

A method for feeding an antistatic compound to a polymerization reactor comprising the steps of: a) dispersing, under mixing conditions, a catalyst powder and an antistatic compound in an oil, so as to form a suspension of catalyst powder and antistatic compound in said oil; b) successively adding, under mixing conditions, a molten thickening agent to said suspension from step a), while maintaining said suspension at a temperature such that said thickening agent solidifies on contact with said suspension; c) transferring the product obtained from b) to a polymerization reactor.

16 Claims, 1 Drawing Sheet

(51) Int. Cl.
    *C08F 110/02* (2006.01)
    *C08F 10/00* (2006.01)
    *C08F 210/16* (2006.01)

(56) References Cited

U.S. PATENT DOCUMENTS

| | | |
|---|---|---|
| 6,936,226 B2 | 8/2005 | Agapiou et al. |
| 8,709,316 B2 | 4/2014 | Walia et al. |
| 2001/0012496 A1 | 8/2001 | Agapiou et al. |
| 2007/0066773 A1 | 3/2007 | Kimberley et al. |
| 2009/0286942 A1* | 11/2009 | Van Pelt ............... C08F 210/16 526/124.3 |
| 2011/0282013 A1 | 11/2011 | Baita et al. |

FOREIGN PATENT DOCUMENTS

| | | | | |
|---|---|---|---|---|
| WO | WO 2008022900 A1 * | 2/2008 | ............. | C08F 10/00 |
| WO | WO 2009030460 A1 * | 3/2009 | ............. | C08F 10/00 |
| WO | WO-2009114761 A2 | 9/2009 | | |
| WO | WO 2010039948 A2 * | 4/2010 | ............. | C08F 10/00 |

OTHER PUBLICATIONS

Occupational Safety & Health Administration, 2,6-di-tert-butylphenol, retrieved Apr. 2015.*
PCT International Search Report & Written Opinion dated Dec. 19, 2011, for PCT/EP2011/066680.

* cited by examiner

METHOD FOR FEEDING AN ANTISTATIC COMPOUND TO A POLYMERIZATION REACTOR

This application is the U.S. National Phase of PCT International Application PCT/EP2011/066680, filed Sep. 26, 2011, claiming priority of European Patent Application No. 10181234.5, filed Sep. 28, 2010 and the benefit under 35 U.S.C. 119(e) of U.S. Provisional Application No. 61/404,679, filed Oct. 7, 2010, the contents of which are incorporated herein by reference in their entirety.

The present invention relates to a method for feeding an antistatic compound to a polymerization reactor. The invention also relates to a process for the polymerization of olefins carried out in the presence of an antistatic compound fed to the polymerization reactor with the method of the invention.

BACKGROUND

In polymerization processes carried out in continuous, particularly in gas-phase processes for olefin polymerization, there is the need to face up to the formation of polymer agglomerates in a the polymerization reactor. Polymer agglomerates involve many negative effects: for example, they can disrupt the discharge of polymer from the reactor by plugging the polymer discharge valves. Furthermore, the agglomerates may also partially cover the fluidization grid of the reactor with a loss in the fluidization efficiency.

It has been found that the presence of fine polymer particles in the polymerization medium favors the formation of polymer agglomerates: these fines may be present as a result of introducing fine catalyst particles or breakage of catalyst and polymer particles within the polymerization medium. The fines are believed to deposit onto and electrostatically adhere to the inner walls of the polymerization reactor and the equipment for recycling the gaseous stream such as, for example, the heat exchanger. If the fines remain active, then the particles will grow in size resulting in the formation of agglomerates, also caused by the partial melting of the polymer itself. These agglomerates when formed within the polymerization reactor tend to be in the form of sheets. Agglomerates can also partially plug the heat exchanger designed to remove the heat of polymerization reaction.

Several solutions have been proposed to resolve the problem of formation of agglomerates during a gas-phase polymerization process. These solutions include the deactivation of the fine polymer particles, the control of the catalyst activity and, above all, the reduction of the electrostatic charge by introducing antistatic agents inside the reactor.

EP 359444 describes the introduction into the polymerization reactor of small amounts of an activity retarder in order to keep substantially constant either the polymerization rate or the content of transition metal in the polymer produced. The process is said to produce a polymer without forming agglomerates.

U.S. Pat. No. 4,803,251 describes a process for reducing the polymer sheeting utilizing a group of chemical additives, which generate both positive and negative charges in the reactor, and which are fed to the reactor in an amount of from about 0.1 to about 25 ppm based on the monomer feed, preferably ethylene, in order to prevent the formation of undesired positive or negative charges.

EP 560035 discloses a polymerization process in which an anti-fouling compound is used to eliminate or reduce the build-up of polymer particles on the walls of a gas-phase polymerization reactor. This anti-fouling compound is preferably selected from alkydiethanolamines, which may be fed at any stage of the gas-phase polymerization process in an amount greater than 100 ppm by weight with respect to the produced (co)polymer. Said anti-fouling compound is capable to selectively inhibit the polymerization on polymer particles smaller than 850 µm, the latter being responsible for fouling problems and polymer sheeting.

It can be pointed out that, when polymerizing olefins by means of a fluidized bed reactor, the prior art literature mainly teaches to introduce antistatic or antifouling compounds directly inside the fluidized polymer bed. As an alternative, these additives are taught to be fed in correspondence of the gas recycle line of the polymerization reactor. Some chemical compounds having antistatic and/or anti-fouling properties are in a solid form at room temperature: examples of them are hydroxyesters, such as glyceryl monostearate (GMS) and glyceryl monopalmitate. Of course, the high temperatures existing inside a gas-phase polymerization reactor guarantee a quick melting of such solid additives, once they are introduced into the reactor. However, technical problems arise for feeding said solid additives to the reactor, because they cannot flow through the feed lines, as in case of liquid antistatic compounds. It is therefore necessary to arrange a heater device on each feed line, so as to melt the additive and to ensure its flowability through the feed lines. Generally, more lines for feeding an antistatic are present in a gas-phase polymerization plant, so that, notwithstanding the total amount of additive to be fed is low, the arrangement of more heaters on each feed line (jacketed pipes) increases the complexity of the polymerization plant and the energy consumption.

For the above reasons, it would be largely desirable to find an alternative method for introducing antistatic and/or anti-fouling compounds into a polymerization reactor.

The Applicant has now surprisingly found an innovative method for feeding antistatic components to a polymerization reactor, the method comprising the preparation of a catalytic paste incorporating said antistatic components and the successive transfer of the catalytic paste to the polymerization reactor.

WO2008/022900 describes a method for preparing a catalytic composition for the olefin polymerization in the form of a dispersion of catalyst particles in a semi-fluid matrix. This method comprises a first step of forming a suspension of catalyst particles in an oil and a successive step involving the addition, under stirring, of a molten thickening agent at a high temperature, so that said thickening agent quickly solidifies on contact with the catalyst suspension, thus forming a semi-fluid paste which incorporates the catalyst particles. The claimed method reveals successful in the preservation of the catalyst powder morphology throughout the line connecting the catalyst storage to the catalyst activation vessel, and successively to the polymerization reactor. However, no mention is made in that patent application of the possibility of incorporating an antistatic component into the catalytic paste.

SUMMARY

It is therefore a first object of the present invention a method for feeding an antistatic compound to a polymerization reactor comprising the steps of:
a) dispersing, under mixing conditions, a catalyst powder and an antistatic compound in an oil, so as to form a suspension of catalyst powder and antistatic compound in said oil;

b) successively adding, under mixing conditions, a molten thickening agent to said suspension from step a), while maintaining said suspension at a temperature such that said thickening agent solidifies on contact with said suspension;

c) transferring the obtained catalytic paste, as such or separated into its components, to a polymerization reactor.

DETAILED DESCRIPTION

The method according to the present invention reveals particularly advantageous in more technical aspects. In fact, on one hand, this method allows the preparation of a catalytic paste which preserves the catalyst morphology and porosity throughout the line connecting the catalyst storage vessel to the polymerization reactor. On the other hand, the method allows also the introduction into a polymerization reactor of antistatic and/or antifouling additives together with the catalytic paste, thus reducing the risk to have fouling problems inside the polymerization reactor.

The terms "anti-fouling agent" or "antistatic agent", as used in the present description, include:
    antistatic substances capable of neutralizing the electrostatic charges of the polymer particles;
    cocatalyst deactivators that partially deactivate the aluminium alkyl co-catalyst, provided that they do not substantially inhibit the overall polymerization activity.

Consequently, an "anti-fouling agent" or "antistatic agent" according to the invention is any substance that is capable to prevent, eliminate or substantially reduce the formation of build-up of polymer on any equipment of the polymerization plant, including sheeting of reactor walls and deposit of polymer agglomerates onto the gas recycle line.

"Oils" and "thickening agents" used in the present invention are necessarily inert compounds towards the catalyst system, that is to say oil and thickening agents cannot react with the catalyst components, such as the solid component, the donor compounds and the catalyst activators.

—Step a)—

Step a) of the invention implies the use of a dispersion tank equipped with a stirring device in order to mix the catalyst powder and the antistatic compound with the mass of oil. Being the catalyst extremely sensitive to oxygen and moisture, the oil fed to the dispersion tank of step a) has to be previously degassed, by means of storage under an inert atmosphere and drying with a nitrogen flow: this pretreatment removes traces of humidity and oxygen.

Oil used for preparing the catalyst suspension of step a) may be selected from mineral oils and synthetic oils. Mineral oils are a mixture of hydrocarbons having a molecular weight distribution comprised between 100 and 1000, with an average molecular weight Mw ranging from 200 to 500. They are liquid compounds at room temperature, immiscible with water and have a relatively low vapor pressure. Preferred mineral oils are paraffinic white oils and, among these, vaseline oils.

The oil is generally the first component which is loaded in the dispersion tank of step a). The catalyst powder should preferably be added slowly to the dispersion tank containing the oil, in order to favors an optimal dispersion of the catalyst powder in the oily mass, avoiding the formation of agglomerates of catalyst onto the oil upper surface.

The catalyst powder has to be previously stored inside a drum under an inert atmosphere. Preferred catalyst components used to form the suspension of step a) are Ziegler-Natta catalyst components comprising a magnesium halide, a titanium compound having at least a Ti-halogen bond, and optionally electron donor compounds.

The antistatic compound used in the present invention may be incorporated in the catalyst suspension formed in step a) in a liquid form, or alternatively, in solid form. The physical state of the antistatic incorporated in the catalyst paste depends on melting point of the antistatic and on the selected temperature when forming the catalyst suspension during step a). In any case, the operative conditions in step a) have to ensure a homogeneous dispersion of the antistatic agent in the oily mass.

According to a first embodiment of the invention, the antistatic compound is incorporated in the catalyst suspension of step a) as a liquid component. In this case the dispersion tank is first loaded with the mass of oil and successively the liquid antistatic is added to the dispersion tank under stirring conditions. These two liquid components are mixed each other for a time generally comprised between 10 and 60 minutes, preferably between 20 and 45 minutes. The stirring conditions adopted in step a) favor an intimate mixing of the antistatic with the oil, thus leading to the formation of a liquid mixture containing the oil and the antistatic compound. Successively, the catalyst powder is loaded into the dispersion tank and the catalyst is dispersed in the oil/antistatic mixture by keeping the tank under mixing conditions for a time comprised between 30 and 150 minutes, preferably between 45 and 120 minutes.

According to a second embodiment of the invention, the antistatic compound is incorporated in the catalyst suspension of step a) as a solid component, for instance in form of powder or micro-beads. This embodiment may be applied to those antistatic agents, which are in solid state at room temperature. In this case, the catalyst suspension of step a) may be prepared following two different alternative procedures, denominated "low temperature procedure" and "high temperature procedure".

According to the "low temperature procedure", both the catalyst and the antistatic are dispersed as solid components in the oily mass and the temperature of the oil fed to the dispersion tank of step a) ranges from 5 C.° to 40° C., preferably from 10 to 30° C. The dispersion tank is equipped with a stirring device, which may be an anchor stirrer or a ribbon stirrer. Successively, the catalyst and the antistatic powder are loaded to the dispersion tank containing the oil, while maintaining the dispersion tank under stirring conditions. The feed sequence of catalyst powder and antistatic to the dispersion tank may be in any whatever order, but preferably these solid components are loaded simultaneously from a storage drum containing these components in a premixed form. After their introduction in the tank containing the oil, the suspension is kept under mixing conditions for a time comprised between 30 and 150 minutes, preferably between 45 and 120 minutes, in order to assure a complete wetting and dispersion of catalyst and antistatic powder in the oily mass.

According to the "high temperature procedure", the oil is fed to the dispersion tank having a stirring device at a temperature ranging from 40 C.° to 90° C., preferably from 60 to 80° C. Successively, the catalyst powder is loaded into the dispersion tank, while maintaining the temperature in the same range of high temperature (40-90° C.). The mixture of oil and catalyst powder is hence maintained under stirring conditions for a time comprised between 30 and 150 minutes, preferably between 45 and 120 minutes, in order to assure a complete dispersion of the catalyst in the oily mass.

Successively, the obtained suspension of catalyst in oil is cooled at a temperature ranging from 5 to 40° C., preferably from 20 to 35° C., and only at this stage the catalyst suspension is added with powder or microbeads of the antistatic compound, while maintaining the suspension under stirring conditions. After the feed of the antistatic, the suspension is then maintained under mixing conditions for a time comprised between 10 and 120 minutes, preferably between 30 and 90 minutes, to assure a complete dispersion of the antistatic agent in the oily mass.

During step a) the mixing conditions are suitably selected with a stirring intensity such to avoid the settling of catalyst and antistatic powder on the bottom of the dispersion tank. On the other hand, the tip speed of the stirring device cannot exceed an upper limit, which could otherwise cause the breakage of the catalyst powder when striking against the stirring device. As a consequence, the mixing conditions during step a) are adjusted by keeping the tip speed of the stirring device of the dispersion tank at values comprised between 0.2 and 0.8 m/s, preferably between 0.4 and 0.6 m/s.

The amount of catalyst powder fed to step a) of the invention is such to form a catalyst suspension in oil with a concentration from 30 g/l to 400 g/l, preferably from 50 g/l to 250 g/l (grams of catalyst for liter of oil).

The amount of antistatic compound fed to step a) of the invention is such that the weight ratio between the antistatic and the catalyst is generally comprised in a range from 0.01 to 5.0, preferably from 0.10 to 3.0.

Suitable anti-fouling agents to be used in step a) of the invention may be selected from the following classes:
(1) Hydroxyesters with at least two free hydroxyl groups, such as glycerol monostearate (GMS90) and glycerol mono palmitate;
(2) Alcohols containing up to 7 carbon atoms;
(3) Ketones containing up to 7 carbon atoms;
(4) Polyepoxidate oils, such as epoxidized soyabean oil (for example EDENOL D81) and epoxidized linseed oil (for example EDENOL D316);
(5) Polyglycerol esters, such as diglycerol monooleate (for example GRINSTED PGE O80/D);
(6) alkyldiethanolammines of formula $R-N(CH_2CH_2OH)_2$ wherein R is an alkyl radical comprised between 10 and 20 carbon atoms;
(7) Amides of formula $R-CONR'R''$, wherein R, R', and R'' may be the same or different, and are a saturated or unsaturated hydrocarbon radical having 1 to 20 carbon atoms.

The preferred class of antistatic agents used in the process of the invention is represented by the hydroxyesters of class (1). The most preferred is glycerol monostearate (GMS90), which is added to the dispersion tank of step a) in form of powder or micro-beads: preferred morphologies are micro-beads.

Among the compounds of class (6) the preferred antistatic is a commercial product sold under the trademark ATMER163® (synthetic mixture of alkyldiethanolammines of formula $R-N(CH_2CH_2OH)_2$, where R is an alkyl radical $C_{13}-C_{15}$). Also natural-based alkyldiethanolammines may be mentioned, for instance ARMOSTAT 410LM.

—Step b)—

Once prepared, the catalyst suspension obtained from step a) is cooled at a temperature generally comprised between 10 and 30° C., before adding the molten thickening agent of step b).

The thickening agent used in step b) of the invention is a solid or semi-solid substance at room temperature, having a melting point in the range from 30 and 70° C. Suitable compounds are selected from petrolatum, greases, and waxes. Preferably molten vaseline grease is used in step b).

The thickening agent is fed into the dispersion tank containing the suspension of catalyst and antistatic agent in oil at a feed temperature in a range from 75° to 110° C., preferably from 85 to 105° C. The molten thickening agent is slowly fed, while stirring the catalyst suspension with a tip speed generally maintained at a value comprised between 0.2 and 0.8 m/s.

During all the time of addition of the molten thickening agent the dispersion tank is subjected to refrigeration, so as to maintain the temperature of the catalyst suspension in a range of from 10 to 30° C. As a consequence, the molten thickening agent solidifies almost instantaneously on contact with the catalyst suspension, thus forming flaky particles which disperse in the oil, further lubricating the overall system. The thermal capacity of the suspension is sufficient to ensure the instantaneous solidification of the thickening agent during its progressive feed to the suspension.

After the addition of the thickening agent, a semi-solid catalytic paste is obtained in which no phase separation (oily phase or solid phase) is observed: the catalytic paste is further cooled and maintained under stirring conditions up to its temperature decreases to a value lower than 25° C., preferably comprised between 0° C. and 20° C. In these conditions the catalytic composition may be transferred in metering syringes suitable to allow the feed of the catalyst to the reaction system with an accurately controlled flow rate.

The amount of molten thickening agent added during step b) is sufficient to form a stable semi-fluid matrix, in which the catalyst particles and the antistatic component remain suspended. The weight ratio (thickening agent)/oil is generally comprised between 0.20 and 0.90, with a total amount of catalyst+antistatic dispersed in the catalytic paste comprised between 50 and 500 g/l (gram of solid for liter of paste). Preferably, the above weight ratio is comprised between 0.35 and 0.70, with a concentration of catalyst+antistatic in the paste comprised between 80 and 250 g/l. It is clear that a higher catalyst concentration implies a lower weight ratio of thickening agent, since the catalyst powder itself acts as a thickener.

The catalytic paste obtained from step b) may be transferred to one or more polymerization reactors as reported hereinafter. The catalytic paste may be transferred as such, or alternatively separated into its components, to the polymerization reactor. If a stream of a liquid alkane, such as propane, is fed along the transfer line connecting the dispersion tank to the polymerization reactor, the catalytic paste may be also subjected to separation into its components by the flow of liquid alkane before entering the reactor.

The method according to the present invention presents many technical advantages. Step a) of the invention is carried out with operative conditions such to assure a complete wetting of the catalyst particles, including the particle pores, so that the interposition of an oil layer hinders an accidental direct friction between the catalyst particles. This contributes to preserve the morphologic properties of the catalytic particles along the line feeding the catalytic paste to a polymerization reactor, avoiding an undesired formation of low size particles of polymer (fines) during the successive prepolymerization and polymerization steps. Moreover, the addition of a thickening agent during step b) does not affect the surface and pores of the catalyst particles, because the latter are separated from the thickening agent matrix by an oil layer.

The catalytic paste obtained by the process of the invention results to be a product of great industrial value: differently from the catalytic pastes known in the art, it contains also incorporated at least one antistatic agent, which is freely released in the polymerization medium in the form of a finely divided liquid, once the catalyst paste enters the polymerization reactor. This gives the additional advantage of reducing the electrostatic charges in the polymerization medium, and minimizing the fouling problems inside the polymerization reactor.

It is therefore a second object of the invention a catalytic paste comprising a catalyst powder and at least one antistatic compound dispersed in a semi-fluid matrix, said matrix comprising an oil and a thickening agent (TA) having a melting point in a range from 30 to 70° C. The weight ratio of thickening agent with respect to the amount of oil is comprised between 0.20 and 0.90, preferably between 0.35 and 0.70, while the weight ratio antistatic/catalyst ranges from 0.01 to 5.0, preferably from 0.10 to 3.0

The oil used for preparing the above catalytic paste may be selected from mineral oils and synthetic oils. Mineral oils are a mixture of hydrocarbons having a molecular weight distribution comprised between 100 and 1000, with an average molecular weight Mw ranging from 200 to 500 (measured at 150° C. and a flow rate of 1.0 mL/min by gel permeation chromatography). Preferred mineral oils are paraffinic white oils and, among these, vaseline oils.

White oils are colorless, odorless, tasteless mixtures of saturated paraffinic and naphthenic hydrocarbons. These nearly chemically inert oils are virtually free of nitrogen, sulfur, oxygen and aromatic hydrocarbons. Suitable white oils are OB22 AT, Winog 70, Duo Prime 500, Fina Vestan A 360B and Shell Ondina 64.

Synthetic oils are selected from silicon oils and chemical compounds synthesized using chemically modified petroleum components, rather than whole crude oil. Synthetic oils can be obtained, for instance, by the oligomerization of decene, fractionating the product to an average of 30 carbon atoms and successive hydrogenation.

It has been further observed that a low viscosity of the oil contributes to maintain unchanged the particle size distribution of the catalytic particles during step a) and b) of the present invention. As a consequence, it is preferable to select oils with a low dynamic viscosity. Generally, suitable oils used in the present invention have a dynamic viscosity at 20° C. comprised between 10 and 250 centiPoise, preferably between 20 and 200 centiPoise.

The thickening agent used to prepare the catalytic paste of the invention is a solid or semi-solid substance at room temperature, having a melting point in the range from 30 and 70° C. Suitable compounds are selected from petrolatum, greases and waxes. Petrolatum is a natural mixture of microcrystalline wax and oil, obtained by fractional distillation of petroleum, as the byproduct of the heaviest lubricating oil fraction. When fully refined it becomes microcrystalline wax.

The preferred waxes used in the present invention are paraffin waxes, in particular vaseline (commonly named also "vaseline grease"). Paraffin waxes contain $C_{18}$-$C_{75}$ hydrocarbons, mainly n-alkanes with lesser amounts of isoalkanes and cycloalkanes. Vaseline has a melting point comprised between 40 and 60° C. and a dynamic viscosity at 50° C. (molten phase) comprised between 30 and 300 cP.

Preferred catalyst components used to form the catalystic paste of the invention are Ziegler-Natta catalyst components comprising a magnesium halide, a titanium compound having at least a Ti-halogen bond, and optionally electron donor compounds. The magnesium halide is preferably $MgCl_2$ in active form which is widely known from the patent literature as a support for Ziegler-Natta catalysts. The preferred titanium compounds are $TiCl_4$ and $TiCl_3$; furthermore, also Ti-haloalcoholates of formula $Ti(OR)_{n-y}X_y$ can be used, where n is the valence of titanium, y is a number between 1 and n−1 X is halogen and R is a hydrocarbon radical having from 1 to 10 carbon atoms.

Other solid catalyst components which may be used in step a) are catalysts based on a chromium oxide supported on a refractory oxide, such as silica, and activated by a heat treatment. These catalysts consist of chromium (VI) trioxide, chemically fixed on silica gel. These catalysts are produced under oxidizing conditions by heating the silica gels that have been doped with chromium(III)salts (precursor or precatalyst). During this heat treatment, the chromium (III) oxidizes to chromium(VI), the chromium(VI) is fixed and the silica gel hydroxyl group is eliminated as water.

Other useful solid catalyst components are single-site catalysts supported on a carrier, preferably metallocene catalysts comprising:
(1) at least a transition metal compound containing at least one n bond;
(2) at least a cocatalyst selected from an alumoxane or a compound able to form an alkylmetallocene cation.

Figure 1:
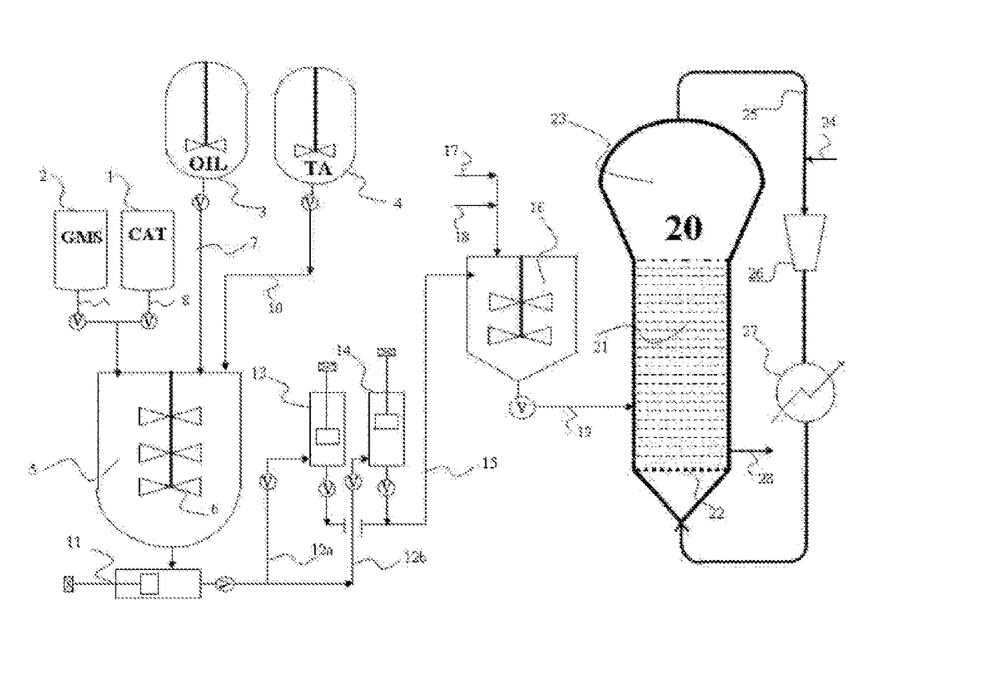
The FIGURE shows devices and lines suitable to convey the catalytic paste from the preparation tank up to the polymerization reactor.

Other advantages and features of the present invention are illustrated in the following detailed description with reference to the attached FIGURE, which shows a process embodiment which is representative and not limitative of the scope of the invention.

The FIGURE shows an embodiment to carry out the invention in which a Ziegler-Natta catalyst powder and microbeads of glycerol monostearate (GMS90 ) as an antistatic are used to prepare the catalytic paste. The FIGURE also shows devices and lines suitable to convey the catalytic paste from the preparation tank up to the polymerization reactor, including the steps of catalyst activation and the olefin polymerization in a fluidized bed reactor.

A Ziegler-Natta catalytic component is stored in form of a dry powder inside the drum 1, while microbeads of glycerol monostearate are stored in drum 2. The vessel 3 contains the oil necessary to form the catalyst suspension of step a), while the vessel 4 contains a thickening agent (TA) to perform step b) of the invention.

A dispersion tank 5 endowed with a stirring device 6 is used to prepare the catalyst suspension of step a). The dispersion tank 5 is first filled with the oil coming from the vessel 3 via line 7.

The catalyst powder is discharged from storage drum 1 via line 8, while the microbeads of GMS90 are discharged from drum 2 via line 9. Both these components are loaded into dispersion tank 5 filled with oil and their load may be performed simultaneously.

When the feeding of the catalyst powder and the antistatic agent in dispersion tank 5 is completed, the mixture is maintained under stirring for the suitable time in order to assure a complete dispersion of the catalyst and GMS90 in the oily mass. Once prepared, the suspension of step a) is successively cooled as previously explained, and successively the molten thickening agent (TA) coming from the vessel 4 is fed via line 10 into the dispersion tank 5. The molten thickening agent is slowly fed, while continuously stirring the catalyst suspension inside the dispersion tank 5. Due to the low temperature of the catalyst suspension, the molten thickening agent solidifies almost instantaneously in flaky particles which disperse in the oil.

When the feeding of the thickening agent is completed, a stable semi-solid catalytic paste is obtained in which no phase separation (oil phase or solid phase) is observed: the catalyst particles and GMS90 microbeads remain suspended in the semi-solid paste. The catalytic paste is then further cooled, always under stirring, at the suitable temperature for being transferred to the successive steps of catalyst activation and gas-phase polymerization of olefins.

As shown in the FIGURE the catalytic paste is withdrawn from dispersion tank 5 avoiding the use of a discharge valve, e.g. a ball valve, but using a device capable of withdrawing the dispersion of catalyst in the semi-solid matrix without rough movements. A dosing syringe 11 is used for softly withdrawing the catalyst paste from the dispersion tank 5 and softly pushing it into line 12 a and 12 b. Moreover, a couple of two dosing syringes 13 and 14 is exploited for ensuring a continuous and delicate metering of catalytic paste to the successive step of catalyst activation. While the syringe 13 is filled with catalytic paste coming from line 12 a, the second syringe 14 pushes and transfers the catalytic paste to line 15. Likewise, when the syringe 14 is filled with catalytic paste coming from line 12 b, the first syringe 13 pushes and transfers the catalytic paste to line 15 and consequently to a catalyst activation vessel 16.

An organo-aluminum compound as the catalyst activator is fed via line 17 to the activation vessel 16. Also a hydrocarbon solvent, such as propane, is conveniently fed via line 18 to the activation vessel 16, optionally together with an electron donor compound.

The activated catalyst system is hence discharged from the activation vessel 16 and fed via line 19 to a fluidized bed reactor 20. This gas-phase reactor is typically operated at a pressure comprised between 10 and 30 bar and at a temperature comprised between 50 and 110° C.

The fluidized bed reactor 20 comprises a fluidized bed 21 of polymer, a fluidization grid 22 and a velocity reduction zone 23. The velocity reduction zone 23 is generally of increased diameter compared to the diameter of the fluidized bed portion of the reactor. The polymer bed is kept in a fluidization state by an upwardly flow of gas fed through the fluidization grid 23 placed at the bottom portion of the reactor.

Schematically, fresh olefin monomers, for instance ethylene and 1-hexene, are fed to the fluidised bed reactor 20 via line 24, which is arranged on correspondence of the gas recycle line 25, through which the unreacted monomers and polymerization diluents are continuously recycled from the velocity reduction zone 23 up to the fluidization grid 22.

The gas recycle line 25 is equipped with a compressor 26 and a heat exchanger 27 placed downstream the compressor 26. The produced polyolefin is continuously discharged from the polymer bed via line 28 and is then transferred to the finishing section of the polymerization plant, or alternatively, it may be transferred to a second gas-phase reactor (not shown) when a multistage polymerization process is performed.

For the above explained reasons, the catalytic paste comprising at least one antistatic compound, as here disclosed, is particularly suitable to be used in a gas-phase or a liquid phase reactor for polymerization of olefins. The use of this catalytic paste ensures a controlled flow rate of catalyst powder introduced into the polymerization reactor, and simultaneously a continuous release in the polymerization medium of an antistatic compound able to neutralize the electrostatic charges.

It is therefore a third object of this patent Application the use of the above described catalytic paste comprising at least one antistatic compound in a process for the polymerization of olefins.

It is a further object of the invention a process for the polymerization of olefins comprising the step of polymerizing one or more α-olefins of formula $CH_2=CHR$, where R is hydrogen or a hydrocarbon radical having from 1 to 12 carbon atoms, in one or more polymerization reactors in the presence of an antistatic compound fed to the polymerization reactor with the method of present invention.

Before feeding to the reactor, the catalyst paste of the invention may be contacted with an organo-aluminum compound at a temperature ranging from 5° C. to 55° C., optionally in the presence of an electron donor compound, in order to activate the catalyst. A liquid hydrocarbon which is inert to the polymerization reaction, preferably a $C_3$-$C_6$ alkane, may be also fed to the catalyst activation vessel. Said liquid hydrocarbon favors the transfer of the catalyst along the line connecting the catalyst activation vessel to the polymerization reactor.

The activated catalyst may be optionally subjected to prepolymerization in a loop reactor before the feeding to the polymerization reactor. The prepolymerization of the catalyst system is usually carried out at a low temperature in a range from 0° C. to 60° C.

The method for feeding an antistatic compound of present invention may be applied to any polymerization plant comprising one or more liquid-phase and/or gas-phase polymerization reactors. The olefin polymerization may be performed in liquid-phase reactors, such as loop reactors and continuously stirred tank reactors (CSTR).

The polymerization step may be also performed in one or more gas-phase polymerization reactors including fluidized bed reactors, stirred bed reactors and reactors having two interconnected polymerization zones, as described in EP-B-782587 and EP-B-1012195.

Further advantages and characteristics of the present invention will appear clear from the following examples, which are not to be intended to limit the scope of the invention.

EXAMPLES

Characterization

The properties given in the examples were measured according to the following methods:

Melt index E (MIE): ASTM-D 1238, condition 190° C./2.16 kg

Density: ASTM-D 792.

Particle Size Distribution (PSD) of Catalyst Powder

The analysis of the catalyst particle size distribution was carried out with a laser analyzer model Malvern Instrument 2600. With this instrument, the measurement of the diameter distribution of single solid catalyst particles is based on the principle of optical diffraction of monochromatic laser light. The field of the instrument, covered through three different lenses, is 2-564 μm.

The analysis comprises the addition of the sample, under nitrogen flow, to a measure cell containing hexane and provided with a stirrer and with a circulation pump having a flow rate comprised between 70 and 100 l/h. The measure is performed while the suspension is circulated. The central process unity of the analyzer processes the received signals and calculates the particle size distribution (PSD) of the sample on different diameter groups.

Example 1

—Preparation of the Solid Catalytic Component—

The solid catalytic component is a Ziegler-Natta catalyst powder comprising a titanium tetrachloride compound supported on a magnesium chloride, and prepared with the procedure described in Example 1 of WO2005/058982, according to which ethylacetate is used as an internal donor compound.

This solid catalytic component has a Ti content of 4.9% by weight, a particle average size of 46 μm and a particle size distribution between 43 and 50 μm.

—Step A—

A dispersion tank with an internal diameter of 14.5 cm is used to prepare the suspension according to step a) of the invention. This tank is equipped with a stirrer, an external water jacket for the temperature regulation, a thermometer and a cryostat.

The following components are used to prepare the catalyst suspension of step a):
the above indicated Ziegler Natta catalyst powder;
white oil OB22 AT having a density of 0.844 g/cm$^3$ and dynamic viscosity of 30 cPs at 20° C.;
microbeads of glycerol monostearate (GMS90, melting point 68° C.) with an average diameter of 336 μm, and a particle size distribution between 150 and 600 μm.

1091 g of white oil OB22 are fed into the dispersion tank at room temperature (25° C.). Successively, 100 g of catalyst powder and 80 g of microbeads of GSM90 are loaded to the tank containing the oil, while maintaining under stirring the dispersion tank.

Once completed the feed of catalyst and GMS90, the obtained suspension is maintained under stirring conditions for 30 minutes adjusting the temperature of the dispersion tank at 13° C.: the velocity of the stirring device is adjusted to 85 rpm during the mixing of the components of the suspension.

The obtained suspension has a catalyst concentration of about 77 g/l (grams of catalyst for liter of oil) and contains the antistatic compound in a weight ratio GMS90/catalyst of 0.8.

—Step B—

Vaseline grease BF (melting point=60° C.; density=0.827 g/cm$^3$) is used as the thickening agent to perform step b) of present invention.

467 g of molten vaseline BF are fed to the dispersion tank containing the catalyst suspension at a feed temperature of 80° C. The molten thickening agent is slowly fed to the catalyst suspension in a time of 3 minutes, while maintaining the suspension under stirring conditions. The catalyst suspension is maintained at a temperature of 13° C. during the addition of the molten vaseline grease: as a consequence, the molten thickening agent solidifies almost instantaneously on contact with the catalyst suspension.

After the feed of the molten vaseline, the components of the catalytic paste are maintained under stirring conditions at a velocity of 85 rpm for a time of 90 minutes. During this time the temperature inside the dispersion tank is kept at 13° C.: at this temperature, the catalytic paste is still sufficiently fluid to be discharged from the dispersion tank by means of a dosing syringe.

The obtained catalytic paste has a grease/oil weight ratio of about 0.43 while the concentration of the solid (catalyst+antistatic) in the catalytic paste is equal to about 90 g/l.

—Catalyst Activation—

As shown in the FIGURE, the obtained catalytic paste is withdrawn by the dispersion tank by a dosing syringe and is then continuously transferred by means of two dosing syringes to a catalyst activation vessel.

A mixture of triisobutyl-aluminium (TIBAL) and diethyl-aluminum chloride (DEAC) in a weight ratio 7:1 is used the catalyst activator, while tetrahydrofurane (THF) is used as the external donor compound. These components are introduced into the activation vessel with the following amounts:
weight ratio (TIBAL+DEAC)/catalyst=10.0;
weight ratio (TIBAL+DEAC)/THF=40.0;

Propane is also fed to the activation vessel as diluent. The above components are contacted for a time of 70 minutes at a temperature of 40° C.

The activated catalytic paste is discharged from the activation vessel and is continuously fed to a fluidized bed reactor for the polymerization of olefins.

—Polymerization—

The activated catalytic paste is introduced into the fluidized bed reactor, where ethylene is copolymerized with 1-butene to produce linear low density polyethylene (LLDPE). The polymerization is operated in the presence of propane as a polymerization diluent and hydrogen as the molecular weight regulator.

The composition of the gaseous reaction mixture is: 30% mol of ethylene, 16% mol of 1-butene, 7.5% mol of hydrogen and 46.5% mol of propane.

The ethylene/1-butene polymerization is carried out at a temperature of 80° C. and a pressure of 25 bar. Under these operative conditions of high temperature and pressure, the components of the catalytic paste separate each other, so that both the catalyst particles and the antistatic compound are freely released in the polymerization medium to carry out their respective functions. In particular, glycerol monostearate GSM90 is subjected to a quick melting, so that it becomes a finely divided liquid (droplets) sprayed on the monomers and polymer particles in the polymerization medium, thus performing its function of neutralizing the electrostatic charges.

The LLDPE copolymer discharged from the reactor shows a density of 0.918 g/cm$^3$ and a melt index MIE of 1.0 g/10 min.

The use of the catalytic paste obtained by the process of the invention allows to discharge continuously LLDPE from the reactor, without having fouling problems inside the fluidized bed reactor and in the equipment arranged along the gas recycle line (compressor and heat exchanger).

Example 2

—Preparation of the Solid Catalytic Component—

The solid catalytic component is a Ziegler-Natta catalyst powder comprising a titanium tetrachloride compound supported on a magnesium chloride, and prepared with the procedure described in Example 2 of WO2010/076289.

The solid catalytic component has a Ti content of 4.9% by weight, a particle average size of 72 μm and a particle size distribution between 57 and 87 μm.

—Step A—

The same dispersion tank of Example 1 is used to prepare the catalyst suspension of step a) with the following components:

the above indicated Ziegler Natta catalyst powder;
white oil OB22 AT having a dynamic viscosity of 30 cPs at 20° C.;
microbeads of glycerol monostearate (GMS90, melting point 68° C.) with the same particle size distribution of example 1.

1005 g of white oil OB22 are fed into the dispersion tank at room temperature (25° C.). Successively, 300 g of catalyst powder and 40 g of microbeads of GMS90 are loaded to the tank containing the oil, while continuously maintaining under stirring the dispersion tank.

Once completed the feed of catalyst and GMS90, the obtained suspension is maintained under stirring conditions for 30 minutes adjusting the temperature of the dispersion tank at 13° C.: the velocity of the stirring device is adjusted to 85 rpm during the mixing of the components of the suspension.

The obtained suspension has a catalyst concentration of about 252 g/l (grams of catalyst for liter of oil). The catalyst suspension contains the antistatic compound in a weight ratio GMS90/catalyst of 0.13.

—Step B)—

Vaseline grease BF is used as the thickening agent to perform step b) of present invention.

431 g of molten vaseline BF are fed to the dispersion tank containing the catalyst suspension at a feed temperature of 80° C. The molten thickening agent is slowly fed for a time of 3 minutes, while stirring the catalyst suspension in the dispersion tank with a velocity of 85 rpm. The catalyst suspension is maintained at a temperature of 13° C. during the addition of the molten vaseline grease: as a consequence, the molten thickening agent solidifies almost instantaneously on contact with the catalyst suspension. After the feed of the molten vaseline, the components of the catalytic paste are always maintained under stirring at 85 rpm for a time of 90 minutes. During this time the temperature is kept at 13° C. in the dispersion tank.

The obtained catalytic paste has a weight ratio grease/oil of about 0.43, while the concentration of the solid (catalyst+antistatic) in the catalytic paste is equal to about 170 g/l.

—Catalyst Activation—

As shown in the FIGURE, the obtained catalytic paste is withdrawn by the dispersion tank by a dosing syringe and is then continuously transferred by means of two dosing syringes to a catalyst activation vessel.

Triisobutyl-aluminium (TIBAL) is used as the cocatalyst with a weight ratio TIBAL/catalyst of 2.5. No external donor is used and propane is fed as a diluent to the activation vessel. The above components are pre-contacted in the activation vessel at a temperature of 20° C. for 90 minutes.

The activated catalytic paste is discharged from the activation vessel and is continuously fed to a fluidized bed reactor for the polymerization of olefins.

—Polymerization—

The activated catalytic paste is introduced into the fluidized bed reactor, where ethylene is polymerized to produce high density polyethylene (HDPE). The polymerization is operated in the presence of propane as a polymerization diluent and hydrogen as the molecular weight regulator.

The composition of the gaseous reaction mixture is: 8% mol of ethylene, 32% mol of hydrogen and 60% mol of propane. The ethylene polymerization is carried out at a temperature of 80° C. and a pressure of 25 bar.

Under these operative conditions of high temperature and pressure, the components of the catalytic paste separate each other, so that both the catalyst particles and the antistatic compound are freely released in the polymerization medium to carry out their respective functions. GSM90 is subjected to a quick melting, so that it becomes a finely divided liquid (droplets) sprayed on the monomers and polymer particles in the polymerization medium, thus performing its function of neutralizing the electrostatic charges.

The HDPE discharged from the reactor shows a density of 0.970 g/cm$^3$ and a melt index MIE of 300 g/10 min.

The use of the catalytic paste obtained by the process of the invention allows to discharge continuously HDPE from the reactor, without having fouling problems inside the fluidized bed reactor and in the equipment arranged along the gas recycle line (compressor and heat exchanger).

Example 3 (Comparative)

Example 2 is repeated selecting the same components and the same operative conditions in steps a) and b) when preparing the catalyst paste. The only difference is that during step a) no antistatic agent is added to the suspension of catalyst powder in oil, so that the obtained catalytic paste does not incorporate glycerol monostearate.

This catalytic paste is activated with the same procedure described in Example 2 and then fed to the fluidized bed reactor in order to produce HDPE. The reactor is managed with the same operating conditions of temperature, pressure, monomer compositions of Example 2.

After a time of 10 hours the formation of polymer chunks inside the fluidized bed of polymer is observed and also fouling on the recycle compressor in the gas recycle line. Moreover, the discharge of HDPE from the reactor is partially interrupted, due to presence of polymer chunks in correspondence of the polymer discharge line.

What is claimed is:
1. A method for feeding an antistatic compound to a polymerization reactor comprising:
   a) dispersing, under mixing conditions, a catalyst powder and an antistatic compound comprising an ester in an oil, wherein the oil has a dynamic viscosity at 20° C. in a range of 10-250 centiPoise, to produce a suspension of the catalyst powder and of the antistatic compound in the oil;
   b) successively adding, under mixing conditions, a molten thickening agent to the suspension of step a) wherein the feed temperature of the molten thickening agent in step b) ranges from 75-110° C. for obtaining a catalytic paste; and
   c) transferring the catalytic paste of step b) or its separate components to a polymerization reactor;
   wherein the catalytic paste, before entering the polymerization reactor, is optionally separated into its components by a flow of liquid alkane;
   the thickening agent has a melting point in a range of 30-70° C.; and
   the components of step a), the components of step b), oil and thickening agent cannot react,
   wherein the oil comprises a mixture of hydrocarbons having a molecular weight distribution comprised between 100 and 1000, with an average molecular weight Mw ranging from 200 to 500 as measured at 150° C. and a flow rate of 1.0 mL/min as measured by gel permeation chromatography, and
   wherein the weight ratio antistatic/catalyst is between 0.01 and 5.0.
2. The method of claim 1, wherein the antistatic compound is incorporated in the suspension of step a) as a solid component.

3. The method of claim 1, wherein step a) comprises the sequence of:
- feeding an oil to a dispersion tank equipped with a stirring device;
- loading said catalyst to said dispersion tank, while maintaining the dispersion tank under stirring conditions;
- mixing the catalyst suspension for a time comprised between 30 and 150 minutes.

4. The method of claim 3, wherein step a) comprises the sequence of:
- after mixing the catalyst suspension for 30-90 minutes, cooling the catalyst suspension to a temperature ranging from 5 to 40° C.;
- after the cooling step, adding said antistatic compound in the form of powder or microbeads to the catalyst suspension, while maintaining the suspension under stirring conditions;
- subjecting the suspension to mixing conditions for a time comprised between 10 and 120 minutes.

5. The method of claim 1, wherein in step a) the antistatic/catalyst weight ratio ranges from 0.10 to 3.0.

6. The method of claim 1, wherein during the addition of said molten thickening agent in step b) the temperature of said suspension is kept at a value ranging from 10 to 30° C.

7. The method of claim 1, wherein:
(i) the weight ratio (thickening agent)/oil is between 0.20 and 0.90; and
(ii) the weight ratio antistatic/catalyst is between 0.10 and 3.0.

8. The method of claim 1, wherein the thickening agent is selected from the group consisting of petrolatum, greases and waxes.

9. The method of claim 1, wherein the method includes the step of polymerizing at least one olefin in the presence of the catalyst paste.

10. The method of claim 9, wherein the polymerization step includes polymerizing one or more α-olefins of formula $CH_2=CHR$, where R is hydrogen or a hydrocarbon radical having from 1 to 12 carbon atoms, in one or more polymerization reactors in the presence of the catalytic paste.

11. The method of claim 3, wherein the oil is fed to the dispersion tank at a temperature ranging from 5 to 40° C.

12. The method of claim 4, wherein the oil is fed to the dispersion tank at a temperature ranging from 40 to 90° C.

13. The method of claim 1, wherein the thickening agent is a mineral oil/wax blend.

14. The method of claim 1, wherein the ester is selected from a hydroxyester and a polyglycerol ester.

15. The method of claim 14, wherein the hydroxyester is selected from glycerol monostearate and glycerol monopalmitate.

16. The method of claim 14, wherein the polyglycerol ester is diglycerol monooleate.

* * * * *

UNITED STATES PATENT AND TRADEMARK OFFICE
CERTIFICATE OF CORRECTION

| | | |
|---|---|---|
| PATENT NO. | : 10,308,731 B2 | Page 1 of 1 |
| APPLICATION NO. | : 13/876719 | |
| DATED | : June 4, 2019 | |
| INVENTOR(S) | : Baita et al. | |

It is certified that error appears in the above-identified patent and that said Letters Patent is hereby corrected as shown below:

In the Specification

In Column 8, Line 4, delete "catalystic" and insert -- catalytic --, therefor

Signed and Sealed this
Twelfth Day of September, 2023

Katherine Kelly Vidal
Director of the United States Patent and Trademark Office